United States Patent
Gong

(10) Patent No.: US 12,348,511 B2
(45) Date of Patent: Jul. 1, 2025

(54) SERVICE PROCESSING METHOD AND APPARATUS, SERVER, AND STORAGE MEDIUM

(71) Applicant: TENCENT CLOUD COMPUTING (Beijing) CO., LTD., Beijing (CN)

(72) Inventor: Jing Gong, Beijing (CN)

(73) Assignee: TENCENT CLOUD COMPUTING (Beijing) CO., LTD, Beijing (CN)

( * ) Notice: Subject to any disclaimer, the term of this patent is extended or adjusted under 35 U.S.C. 154(b) by 263 days.

(21) Appl. No.: 18/115,638

(22) Filed: Feb. 28, 2023

(65) Prior Publication Data

US 2023/0208831 A1 Jun. 29, 2023

Related U.S. Application Data

(63) Continuation of application No. PCT/CN2021/107620, filed on Jul. 21, 2021.

(30) Foreign Application Priority Data

May 26, 2021 (CN) .......................... 202110581491.3

(51) Int. Cl.
  *H04L 9/40* (2022.01)
  *H04W 12/08* (2021.01)
(52) U.S. Cl.
  CPC ............ *H04L 63/083* (2013.01); *H04L 63/08* (2013.01); *H04L 63/10* (2013.01); *H04W 12/08* (2013.01)
(58) Field of Classification Search
  None
  See application file for complete search history.

(56) References Cited

U.S. PATENT DOCUMENTS

2015/0143462 A1* 5/2015 Li .......................... G06Q 10/00
                                                                      726/3
2019/0339688 A1   11/2019 Cella et al.

FOREIGN PATENT DOCUMENTS

CN          103561083 A         2/2014
CN          108270855 A         7/2018
                       (Continued)

OTHER PUBLICATIONS

BookStacks.cn, "EMQX V3.0", Retrieved from the Internet: https://www.bookstack.cn/read/emqx-v3.0/90bfSbca23cd64a7.md, Jun. 2019, 42 pgs.

(Continued)

*Primary Examiner* — Lashonda Jacobs-Burton
(74) *Attorney, Agent, or Firm* — Morgan, Lewis & Bockius LLP

(57) ABSTRACT

This application provides a service processing method performed by a computer server. The method includes: receiving a message transmission request transmitted by a target Internet of Things (IoT) device; invoking a service processing plug-in to perform access authentication on the target IoT device, the service processing plug-in being configured in a message queuing telemetry transport (MQTT) server; invoking the service processing plug-in to acquire a message operation permission of the target IoT device when the access authentication is passed, the message operation permission indicating a message operation rule corresponding to the target IoT device; and executing a message transmission service indicated by the message transmission request when the message transmission request matches the message operation rule indicated by the message operation permission. According to the embodiments of this application, costs of the access authentication can be saved and security of the message transmission service can be improved.

18 Claims, 6 Drawing Sheets

(56) References Cited

FOREIGN PATENT DOCUMENTS

| CN | 108833154 | A |   | 11/2018 |   |          |
|----|-----------|---|---|---------|---|----------|
| CN | 109587228 | A |   | 4/2019  |   |          |
| CN | 109587242 | A |   | 4/2019  |   |          |
| CN | 110048927 | A |   | 7/2019  |   |          |
| CN | 110971614 | A | * | 4/2020  | ............ | H04L 67/02 |
| CN | 112333227 | A |   | 2/2021  |   |          |
| CN | 112671775 | A | * | 4/2021  |   |          |
| CN | 113015165 | A | * | 6/2021  |   |          |

OTHER PUBLICATIONS

Tencent Technology, WO, PCT/CN2021/107620, Feb. 25, 2022, 4 pgs.
Tencent Technology, IPRP, PCT/CN2021/107620, Nov. 21, 2023, 5 pgs.
Tencent Technology, ISR, PCT/CN2021/107620, Feb. 23, 2022, 2 pgs.

* cited by examiner

| Field name | Type | Whether it is required | Field description | Field content |
|---|---|---|---|---|
| id | string | yes | built-in objectID of the service processing plug-in | 5d1bd79b0c7c8b118529b3d |
| username | string | yes | username of the Internet of Things device connected to the MQTT server may be equal to a device ID of the Internet of Things device | userid_001 |
| password | string | yes | salted value corresponding to the username | 129735f35afe58 |
| is_superuser | bool | yes | whether to be an administrative device | fasle |
| salt | string | yes | used for salting | mysalt |

FIG. 4

```
Key                                         Value
(1)ObjectID("5d1dbd79b0v7v8b11")            {5 fields}
    id                                      ObjectID("5d1dbd79b0v7v8b11")
    username                                userid_001
    password                                129735f3af16d9a3a6784752d0345
    is_superuser                            fasle
    salt                                    mysalt
(2)ObjectID("5d1dbd061b0v7v8b1")            {5 fields}
    id                                      ObjectID("5d1dbd061b0v7v8b1")
    username                                userid_002
    password                                129735f3af16d9a3a6784752d0345
    is_superuser                            true
    salt                                    mysalt
(3)ObjectID("7d1dbd061b0v7v898")            {5 fields}
    id                                      ObjectID("7d1dbd061b0v7v898")
    username                                userid_003
    password                                129735f3af16d9a3a6784752d0345
    is_superuser                            fasle
    salt                                    mysalt
```

FIG. 5

| | Field name | Type | Whether it is required | Field description | Field content |
|---|---|---|---|---|---|
| | id | string | yes | built-in objectID of the service processing plug-in | 5d1bd79b0c7c8b118529b3d |
| 5020 | publish | string | yes | message types that the target Internet of Things device can publish | temperature |
| 5021 | subscribe | arry | yes | message types that the target Internet of Things device can subscribe to | weather |
| 5022 | pubsub | arry | no | message types that the target Internet of Things device can publish and subscribe to used for salting | temperature |
| 501 | username | string | yes | username of the Internet of Things device connected to the MQTT server may be equal to a device ID of the Internet of Things device | userid_001 |

(503 points to Field name/Type header; 504 to Field content; 505 to id row; 502 to the dashed group containing publish/subscribe/pubsub)

FIG. 6

```
Key                                          Value
(1)ObjectID("5d1dbd79b0v7v8b11")             {5 fields}
    id                                       ObjectID("5d1dbd79b0v7v8b11")
51  publish                                  {1element}
        [0]                                  /smarthome/%c/temperature
52  subsctibe                                {1element}
        [0]                                  $SYS/#
53  pubsub                                   {1element}
        [0]                                  /smarthome/%c/temperature
```

FIG. 7

SERVICE PROCESSING METHOD AND APPARATUS, SERVER, AND STORAGE MEDIUM

CROSS-REFERENCE TO RELATED APPLICATIONS

This application is a continuation application of PCT Patent Application No. PCT/CN2021/107620, entitled "SERVICE PROCESSING METHOD AND APPARATUS, SERVER, AND STORAGE MEDIUM" filed on Jul. 21, 2021, which claims priority to Chinese Patent Application No. 202110581491.3, filed with the China National Intellectual Property Administration on May 26, 2021 and entitled "SERVICE PROCESSING METHOD AND APPARATUS, SERVER, AND STORAGE MEDIUM", all of which are incorporated herein by reference in their entirety.

FIELD OF THE TECHNOLOGY

This application relates to the field of Internet of Things (IoT), and in particular, to a service processing method and apparatus, a server, and a storage medium.

BACKGROUND OF THE DISCLOSURE

At present, the global Internet of Things market is increasing rapidly in terms of scale, and Internet of Things devices are growing explosively. It is estimated that by 2020, a volume of access to global Internet of Things devices will reach 50 billion. Such a large number of Internet of Things devices are all intended to be connected to other Internet of Things devices and application programs and to communicate information by using Internet transport protocols, and an Internet of Things platform is required to establish an interconnection bridge between the Internet of Things devices and the application programs. The application programs are installed in the Internet of Things devices, and the Internet of Things platform may transmit control instructions to the application programs in the Internet of Things devices to control the Internet of Things devices. Conversely, the application programs in the Internet of Things devices may collect some information about operation of the Internet of Things devices and report the information to the Internet of Things platform.

At present, a large number of commercial Internet of Things platforms and private Internet of Things platforms have emerged. Current Internet of Things platforms generally use some commercial or open-source message queuing telemetry transport (MQTT) servers as carriers, and are developed on this basis. In general, prior to message transmission between the Internet of Things devices and the Internet of Things platform, a separate authentication server needs to be developed to authenticate the Internet of Things devices, and then executes a message transmission service after the authentication is passed. However, there is a need to develop an additional set of access authentication services for the service execution manner, which is complex, not universal, and has high development and maintenance costs. Therefore, in the field of Internet of Things applications, how to execute the message transmission service has become one of the hot issues in today's research.

SUMMARY

Embodiments of this application provide a service processing method and apparatus, a server, and a storage medium, which realize access authentication on an Internet of Things device based on a plug-in function of an MQTT server, do not require additional development of access authentication services, reduce costs of the access authentication, and control a message operation permission of the Internet of Things device through the plug-in function, improving security of a message transmission service.

In an aspect, an embodiment of this application provides a service processing method, the method being performed by an MQTT server, and the method including:
  receiving a message transmission request transmitted by a target Internet of Things device;
  invoking a service processing plug-in to perform access authentication on the target Internet of Things device, the service processing plug-in being configured in the MQTT server;
  invoking the service processing plug-in to acquire a message operation permission of the target Internet of Things device when the access authentication is passed, the message operation permission indicating a message operation rule corresponding to the target Internet of Things device; and
  executing a message transmission service indicated by the message transmission request when the message transmission request matches the message operation rule indicated by the message operation permission.

In an aspect, an embodiment of this application provides a service processing apparatus, the apparatus supporting an MQTT service, and the apparatus including:
  a receiving unit configured to receive a message transmission request transmitted by a target Internet of Things device;
  a processing unit configured to invoke a service processing plug-in to perform access authentication on the target Internet of Things device, the service processing plug-in being configured in the apparatus;
  the processing unit being further configured to invoke the service processing plug-in to acquire a message operation permission of the target Internet of Things device when the access authentication is passed, the message operation permission indicating a message operation rule corresponding to the target Internet of Things device; and
  an execution unit configured to execute a message transmission service indicated by the message transmission request when the message transmission request matches the message operation rule indicated by the message operation permission.

In an aspect, an embodiment of this application provides a server, the server including:
  a processor adapted to implement one or more instructions; and
  a computer storage medium, the computer storage medium storing one or more instructions adapted to be loaded by the processor and perform the following steps:
  receiving a message transmission request transmitted by a target Internet of Things device; invoking a service processing plug-in to perform access authentication on the target Internet of Things device, the service processing plug-in being configured in an MQTT server; invoking the service processing plug-in to acquire a message operation permission of the target Internet of Things device when the access authentication is passed, the message operation permission indicating a message operation rule corresponding to the target Internet of Things device; and executing a message transmission service indicated by the message transmission request when the message transmission request matches the message operation rule indicated by the message operation permission.

In an aspect, an embodiment of this application provides a computer storage medium storing a computer program instruction, the computer program instruction, when executed by a processor, being used for performing the following steps:

receiving a message transmission request transmitted by a target Internet of Things device; invoking a service processing plug-in to perform access authentication on the target Internet of Things device, the service processing plug-in being configured in an MQTT server; invoking the service processing plug-in to acquire a message operation permission of the target Internet of Things device when the access authentication is passed, the message operation permission indicating a message operation rule corresponding to the target Internet of Things device; and executing a message transmission service indicated by the message transmission request when the message transmission request matches the message operation rule indicated by the message operation permission.

In an aspect, an embodiment of this application provides a computer program product or a computer program including a computer instruction stored in a computer-readable storage medium; a processor of a server reading the computer instruction from the computer-readable storage medium and performing the following steps:

receiving a message transmission request transmitted by a target Internet of Things device; invoking a service processing plug-in to perform access authentication on the target Internet of Things device, the service processing plug-in being configured in an MQTT server; invoking the service processing plug-in to acquire a message operation permission of the target Internet of Things device when the access authentication is passed, the message operation permission indicating a message operation rule corresponding to the target Internet of Things device; and executing a message transmission service indicated by the message transmission request when the message transmission request matches the message operation rule indicated by the message operation permission.

In the embodiments of this application, when receiving the message transmission request transmitted by the target Internet of Things device, the MQTT server invokes the service processing plug-in therein to perform access authentication on the target Internet of Things device. The access authentication on the target Internet of Things device is realized through a plug-in function of the MQTT server, which does not require additional deployment of access authentication services, has wide universality, and saves costs of the access authentication. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule. Such message operation control over the Internet of Things device can improve accuracy and security of the message transmission service.

BRIEF DESCRIPTION OF THE DRAWINGS

FIG. 4 is a schematic diagram of an authentication information statistical table of an Internet of Things device according to an embodiment of this application;

FIG. 5 is a schematic diagram of an access authentication control database (DB) according to an embodiment of this application;

FIG. 6 is a schematic diagram of a message control statistical table of an Internet of Things device according to an embodiment of this application;

FIG. 7 is a schematic diagram of a message operation permission control DB according to an embodiment of this application;

DESCRIPTION OF EMBODIMENTS

Technical solutions in embodiments of this application are clearly and fully described below with reference to the accompanying drawings in the embodiments of this application.

Internet of Things achieves ubiquitous connections between things and between things and humans by real-time collecting any object or process that needs to be monitored, connected, and interacted and collecting various required information such as acoustical, optical, thermal, electrical, mechanical, chemical, biological, and positional information via various possible network accesses by using various apparatuses and technologies such as various information sensors, radio frequency identification technologies, global positioning systems, infrared sensors, and laser scanners, thereby achieving intelligent perception, identification, and management for items and processes. In short, the Internet of Things is the Internet where everything is connected, which is a network extended and expanded based on the Internet, is a huge network formed by combining various information sensing devices with the network, and achieves interconnections of humans, machines, and things at any time and any place. Internet of Things technologies are widely used in daily life. At present, some mainstream Internet of Things devices may include devices such as smart wearables and smart homes. The smart wearables may include smart elderly wearables, smart pet wearables, smart adult watches, smart children's watches, and the like. The smart homes may include mart air purifier platforms, sweeping robots, smart sockets, smart kitchens and bathrooms, and the like.

Figure 1:
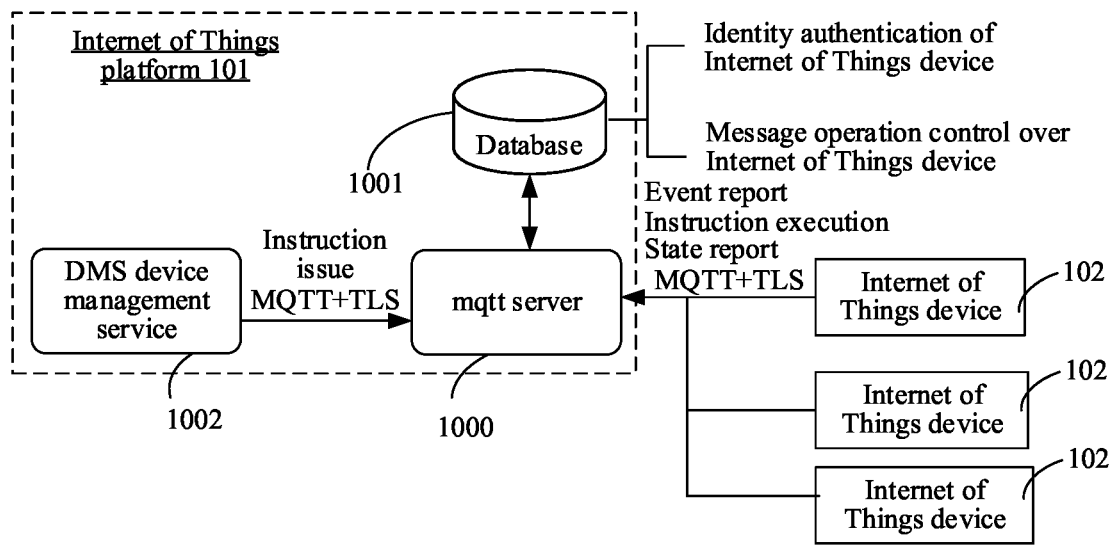
FIG. 1 is a schematic diagram of a management system of an Internet of Things device according to an embodiment of this application.

An embodiment of this application provides a management system of an Internet of Things device. FIG. 1 is a schematic diagram of a management system of an Internet of Things device according to an embodiment of this application. The management system in FIG. 1 may include an Internet of Things platform 101 and at least one Internet of Things device 102. As can be seen from FIG. 1, in the management system, a large number of Internet of Things devices 102 can be connected downwards, and data collection and reporting by the Internet of Things devices can be supported. The Internet of Things platform 101 provides a device management service (the device management service may be realized through an administrator's management device), which may be called a device management cloud. The Internet of Things platform 101 provides a device management cloud interface (application programming interface (API)), and invokes and transmits instruction data through the API to realize remote control over the Internet of Things devices.

The Internet of Things platform 101 is developed based on an MQTT protocol, and message transmission between the Internet of Things device 102 and the Internet of Things platform 101 is based on the MQTT protocol. Specifically, the Internet of Things device 102 may report some of collected data to the Internet of Things platform 101 based on the MQTT protocol. This process may be called the Internet of Things device publishing a message. For example, the Internet of Things device is cameras in a shopping mall. The cameras may collect locations and time of various users' stay in the shopping mall, and report such data to the Internet of Things platform 101, so as to analyze the users' shopping preferences and the like based on the data.

The Internet of Things platform 101 may push some messages to the Internet of Things device 102. The messages may be regarded as messages that the Internet of Things device 102 subscribes to in advance. For example, if the Internet of Things device subscribes to a message about a piece of data in advance, when the data changes, the Internet of Things platform 101 pushes the changing data to the Internet of Things device 102.

In an embodiment, the Internet of Things platform 101 may include an MQTT server (or called an MQTT broker) 1000, a DB 1001, and a distributed message service (DMS) device management service 1002 (also called a management device). At present, a mainstream version supporting the MQTT protocol is 3.1.1, but a more active MQTT server exits a version supporting an MQTT5.0 protocol. EXQ.X has supported the MQTT5.0 protocol since the 3.0 release version, and is the earliest server in an open source community to support the MQTT5.0 protocol. In the embodiments of this application, EMQ.X may be selected as the MQTT server. The DMS device management service 1002 may be regarded as a client of the Internet of Things platform. The client may be deployed on the administrator's terminal device. The terminal device may be a smart phone, a tablet computer, a laptop, a desktop computer, a vehicle-mounted device, a smart speaker, a smart watch, or the like.

The administrator adds relevant information of the Internet of Things device to or deletes the relevant information of the Internet of Things device from the DB 1001 through the DMS device management service. For example, a device identifier and login information of an Internet of Things device are added to the DB 1001. In another example, a message operation permission of an Internet of Things device is added to the DB 1001. A device identifier, login information, and a message operation permission of at least one Internet of Things device may be stored in the DB 1001. The device identifier and the login information are used for identity authentication or access authentication on a device end (at least one Internet of Things device). The message operation permission is used for topic access control over the device end. The message operation permission may specify messages that an Internet of Things device can subscribe to, messages that the Internet of Things device can publish, and rules for subscribing to or publishing messages, and the like.

The MQTT broker (or simply referred to as the MQTT server) is responsible for invoking a service processing plug-in to perform access authentication on the Internet of Things device 102 connected to the Internet of Things platform 101 and execute a message transmission service requested by the Internet of Things device 102 after the access authentication is passed. In the embodiments of this application, the service processing plug-in of the MQTT server may be mongoDB. The service processing plug-in may be pre-configured by the DMS device management service, or access authentication logic and message operation control logic are pre-configured in the service processing plug-in by the DMS device management service. After the MQTT server receives a message transmission request transmitted by the Internet of Things device 102, the access authentication logic in the service processing plug-in is loaded to perform access authentication on the Internet of Things device 102. After the access authentication is passed, the message operation control logic in the service processing plug-in is invoked to acquire a message operation permission of the Internet of Things device 102. Further, if the message transmission request matches a message operation rule indicated by the message operation permission, a message transmission service indicated by the message transmission request is executed. The message transmission service may include either of a message publishing service and a message subscription service.

The access authentication on the Internet of Things device through the management system shown in FIG. 1 does not require an additional personalized authentication service, saves costs of the access authentication, and has wide universality. In addition, message operation control over each Internet of Things device realizes fine-grained message operation management, and improves security and accuracy of message transmission between the Internet of Things device and the Internet of Things platform.

Figure 2:
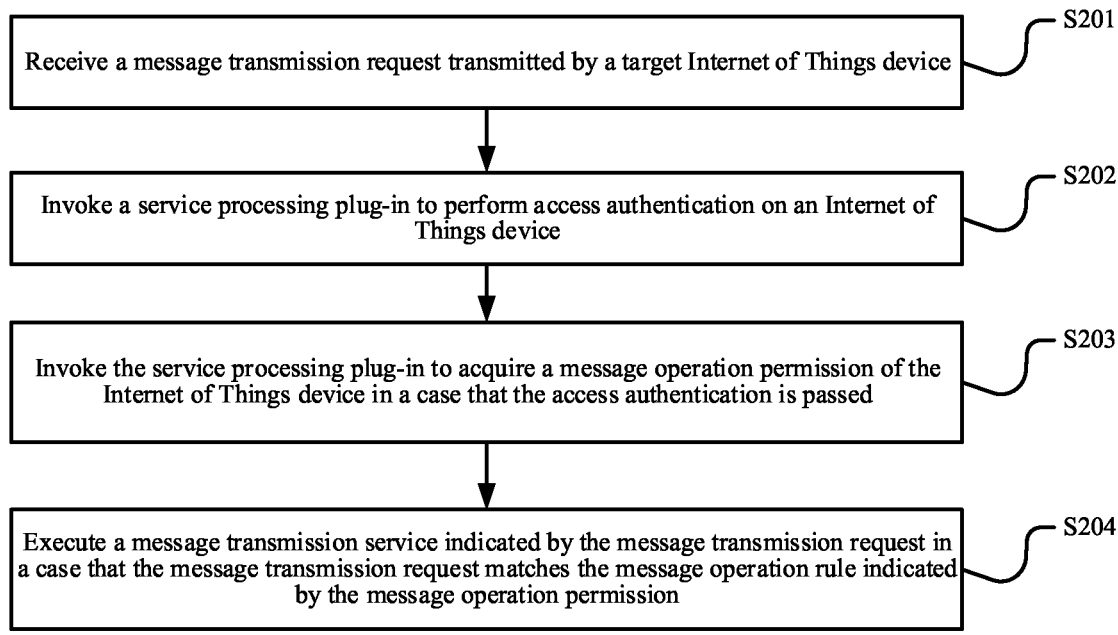
FIG. 2 is a schematic flowchart of a service processing method according to an embodiment of this application.

Based on the above management system of the Internet of Things device, an embodiment of this application provides a service processing method. Refer to FIG. 2 which is a schematic flowchart of a service processing method according to an embodiment of this application. The service processing method shown in FIG. 2 may be performed by an MQTT server, which may specifically be performed by a processor of the MQTT server. The service processing method shown in FIG. 2 may include the following steps:

Step S201: Receive a message transmission request transmitted by a target Internet of Things device.

In an embodiment, a client of the MQTT server may run in the target Internet of Things device. The message transmission request may be transmitted through the client in the target Internet of Things device. A message transmission service indicated by the message transmission request may be a message publishing service or a message subscription service.

The message publishing service may be understood as the target Internet of Things device reporting messages collected by the Internet of Things device to the Internet of Things platform. For example, the target Internet of Things device is a camera in a shopping mall, the target Internet of Things device may collect information about what users are buying and browsing at a particular location in the shopping mall, and the message publishing service may mean that the target Internet of Things device reports the information about what the users are buying and browsing at the particular location in the shopping mall to the Internet of Things platform. Through a management interface provided by the Internet of Things platform, the administrator may understand information about what users are buying and browsing at various positions. The message subscription service may be understood as the target Internet of Things device acquiring some messages from the Internet of Things platform, for example, what control instructions the target Internet of Things device may acquire from the Internet of Things platform.

Step S202: Invoke a service processing plug-in to perform access authentication on an Internet of Things device.

In order to ensure security of message transmission between the Internet of Things device and the Internet of Things platform, the Internet of Things platform needs to perform access authentication on the Internet of Things device after the Internet of Things device publishes a message transmission request to the Internet of Things platform. The so-called access authentication means that, before the Internet of Things device is connected to the Internet of Things platform, the Internet of Things platform identifies and authenticates identity of the Internet of Things device according to a certain strategy, so as to ensure validity of the Internet of Things device connected to the Internet of Things platform. At the same time, a certification of the Internet of Things device that has been authenticated is recorded as an identity credential for the Internet of Things device to run on the Internet of Things platform. The access authentication includes two processes, i.e., identity identification and identity authentication. The identity identification is a process in which the Internet of Things device presents its own identity certificate to the Internet of Things platform, and the identity authentication is a process in which the Internet of Things platform checks the identity certificate of the Internet of Things device. The access authentication is an important part of security of the Internet of Things platform. For an invalid Internet of Things device, an access authentication mechanism restricts its access to resources of the Internet of Things platform. For a valid Internet of Things device, the access authentication allows the valid Internet of Things device to access the Internet of Things platform and generates an identity certificate for the valid Internet of Things device. The access authentication is a basis for other security mechanisms in the Internet of Things platform.

The Internet of Things platform's access authentication on the Internet of Things device is performed by the MQTT server in the Internet of Things platform, which may specifically be implemented by the MQTT server invoking the service processing plug-in in the MQTT server. Specifically, the invoking a service processing plug-in to perform access authentication on an Internet of Things device may include: querying whether a certification of the Internet of Things device has been recorded on the Internet of Things platform; determining that the access authentication is passed if yes (indicating that the Internet of Things device has completed identity identification and identity authentication on the Internet of Things platform); and performing identity identification and identity authentication on the Internet of Things device if no record of the certification is found.

Login information of the Internet of Things device carried in the message transmission request is acquired from the message transmission request when identity identification and identity authentication are performed on the Internet of Things device. The acquired login information is matched in an access authentication control DB. It is determined that the access authentication on the target Internet of Things device is passed if target access authentication reference information matching the login information exists in the access authentication control DB. The target access authentication reference information is generated based on login information of the target Internet of Things device.

In an embodiment, the target access authentication reference information may include a login information storage field, and the login information of the target Internet of Things device is stored in the login information storage field. The target access authentication reference information matching the login information may be the login information carried in the message transmission request being the same as the login information included in the target access authentication reference information.

If the target access authentication reference information matching the login information exists in the access authentication control DB, it indicates that the target Internet of Things device has been pre-registered with the Internet of Things platform and is a valid Internet of Things device. Therefore, it may be determined that the access authentication is passed. Conversely, if the target access authentication reference information matching the login information does not exist in the access authentication control DB, it indicates that the target Internet of Things device is not a device registered with the Internet of Things platform and may be an invalid Internet of Things device. Therefore, it may be determined that the access authentication is not passed.

Step S203: Invoke the service processing plug-in to acquire a message operation permission of the Internet of Things device when the access authentication is passed.

Generally, there are two types of devices connected to the Internet of Things platform. One type is common devices. This type of devices has no administrative permissions on the Internet of Things platform and can only publish or access specified types of messages on the Internet of Things platform. The other type is management devices. This type of devices may manage devices connected to the Internet of Things platform, such as add a new Internet of Things device, or delete a device from Internet of Things devices connected to the Internet of Things platform. The management devices may be colloquially called super users of the Internet of Things platform.

In order to control validity of resource use in the Internet of Things platform, a same data resource corresponds to a same message resource, and the Internet of Things platform assigns different permissions to different devices according to different application requirements. For example, the management devices in the Internet of Things platform have permissions to access and publish all types of messages, while a common Internet of Things device can only access and publish messages related to the common Internet of Things device. In addition, for a same message resource, results obtained by access by different permissions may be different. For example, if a message resource includes data content that needs to be kept confidential and is only accessible to management devices with administration permissions and includes some data content that is public and accessible to all Internet of Things devices, the management device with the highest access permission can access all the data content in the message resource, while a common Internet of Things device with a general access permission can only access the public data content in the message resource.

Therefore, after the access authentication on the target Internet of Things device is passed, in order to accurately and quickly execute the message transmission service indicated by the message transmission request, the MQTT server needs to acquire a message operation permission of the target Internet of Things device. The message operation permission specifies types of messages accessible to the target Internet of Things device and a message operation rule for access to each type of messages. For example, the message operation permission of the target Internet of Things device may be assumed as follows: In the case of message publishing, a message operation rule that needs to be followed is: /smarthome/{client ID}/temperature; where client ID denotes a device representation of the target Internet of Things device, and temperature denotes a type of messages that the target Internet of Things device can publish, and/smarthome/{client ID}/temperature denotes a message operation rule that the target Internet of Things device needs to follow when publishing a temperature message. In other words, if the target Internet of Things device does not adopt the above message operation rule when publishing a temperature-type message, the MQTT server may not process the message published by the target Internet of Things device.

Step S204: Execute a message transmission service indicated by the message transmission request when the message transmission request matches the message operation rule indicated by the message operation permission.

After the message operation permission of the target Internet of Things device is acquired through step S203, in order to ensure security and accuracy of the execution of the message transmission service, the MQTT server determines whether the received message transmission request matches the message operation rule indicated by the message operation permission. The message transmission service indicated by the message transmission request is executed if the message transmission request matches the message operation rule indicated by the message operation permission. The message transmission request is discarded if the message transmission request does not match the message operation rule indicated by the message operation permission.

In the embodiments of this application, when receiving the message transmission request transmitted by the target Internet of Things device, the MQTT server invokes the service processing plug-in therein to perform access authentication on the Internet of Things device. The access authentication on the Internet of Things device is realized through a plug-in function of the MQTT server, which does not require additional deployment of access authentication services and has wide universality. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule. Such message operation control over the Internet of Things device can improve accuracy and security of the message transmission service.

Figure 3:
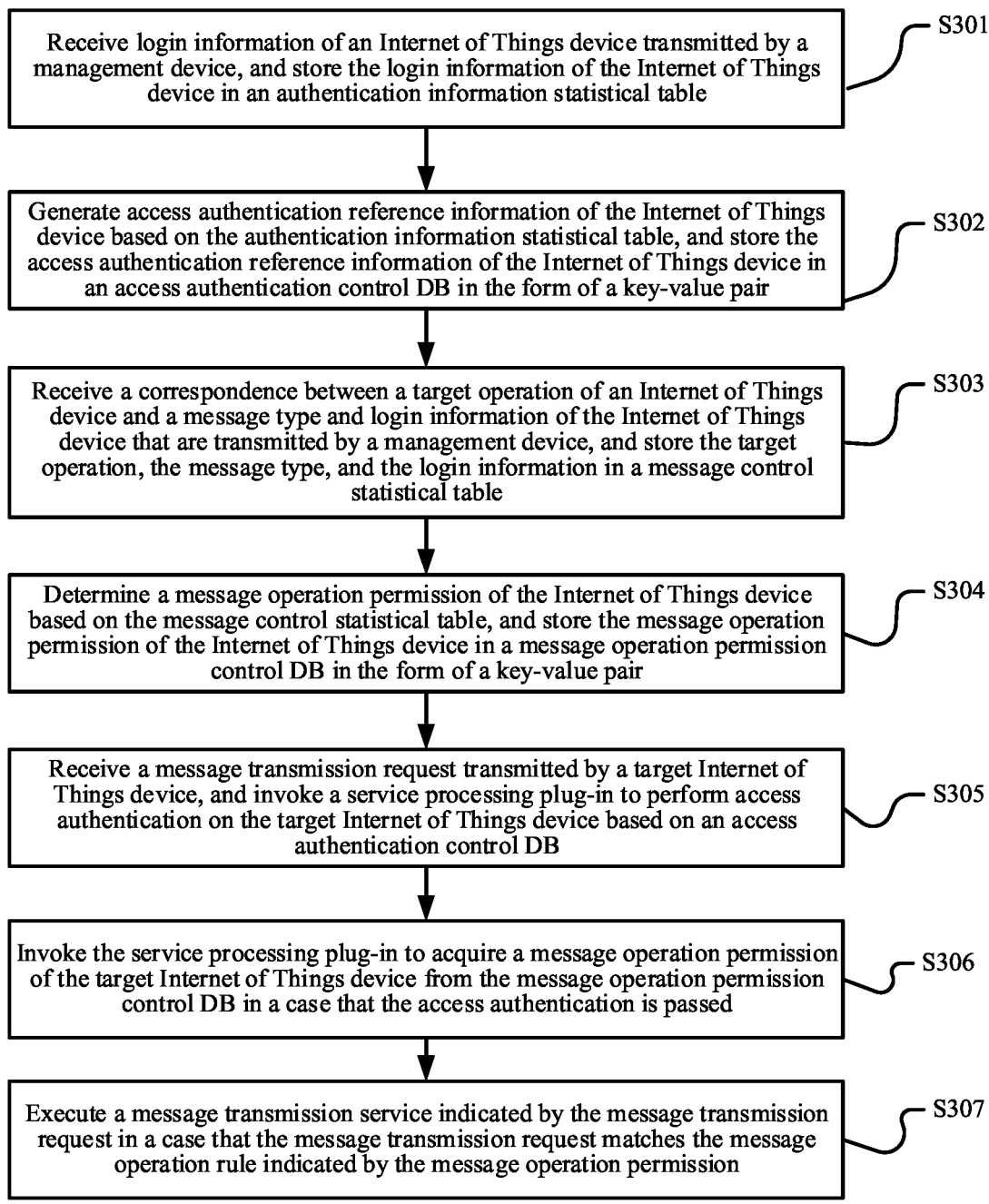
FIG. 3 is a schematic flowchart of another service processing method according to an embodiment of this application.

Refer to FIG. 3 which is a schematic flowchart of another service processing method according to an embodiment of this application. The service processing method shown in FIG. 3 may be performed by an MQTT server, which may specifically be performed by a processor of the MQTT server. The service processing method shown in FIG. 3 includes the following steps:

Step S301: Receive login information of an Internet of Things device transmitted by a management device, and store the login information of the Internet of Things device in an authentication information statistical table.

In some embodiments, the management device is equivalent to the device that provides the DMS device management service in the management system shown in FIG. 1. An administrator may manage Internet of Things devices connected to the Internet of Things platform through the management device. Specifically, Internet of Things devices allowed to access the Internet of Things platform may be set, login information of the Internet of Things devices are uploaded to the MQTT server in advance, and the MQTT server stores the login information for subsequent access authentication based on the login information of the Internet of Things devices.

The Internet of Things device may be any Internet of Things device. The Internet of Things device may be a target Internet of Things device or an Internet of Things device other than the target Internet of Things device. The login information of the Internet of Things device may include username and password. Username and password of each Internet of Things device are different. Such a one-machine-one-password (that is, username and password of each Internet of Things device are different) mechanism can reduce a risk of hacking of the Internet of Things devices and improve security.

In some embodiments, the management device may also transmit a device identifier of at least one Internet of Things device to the MQTT server. The device identifier of any Internet of Things device may be expressed as clientID, which represents unique identity of the Internet of Things device connected to the Internet of Things platform. The device identifier of each Internet of Things device is different.

In some embodiments, the authentication information statistical table of each or any Internet of Things device may be expressed in the form of a table. The table may include a login information storage field. The storing the login information of the Internet of Things device in an authentication information statistical table may include: filling in the login information storage field of the table corresponding to the Internet of Things device with the login information of the Internet of Things device. Each field of the authentication information statistical table of the Internet of Things device may include a field name item and a field content item. For example, in the authentication information statistical table, content in the field name item included in the login information storage field is "login information", and field content in the field content item is "specific content of the login information". Therefore, the filling in the login information storage field with the login information of the Internet of Things device is actually to find or create a login information storage field named login information in the authentication information statistical table. Then, the login information of the Internet of Things device is used as the content in the field content item of the login information storage field.

As can be seen from the foregoing, the login information of the Internet of Things device includes username and password. Correspondingly, the login information storage field may include two fields, of which one is a username field and the other is a password field. For example, FIG. 4 is a schematic diagram of an authentication information statistical table of an Internet of Things device according to an embodiment of this application. Field content 401 represents the username field, and field content 402 represents the password field. For the username field 401, a field name may be expressed as "username", and field content may be expressed as "userid_001". In another example, for the password field 402, a field name may be expressed as "password", and field content may be expressed as "129735f35afe58".

In an embodiment, assuming that the first field is any field in the authentication information statistical table, the first field may also include a content type item of content that the field content belongs to, which may be expressed as "type", as shown by 403 in FIG. 4. For example, if the field content in the username field 401 in FIG. 4 belongs to a string type, string is displayed at the content type item of 401.

In another embodiment, the first field may also include an indication item indicating whether the field is a required field, as shown by 404 in FIG. 4. The indication item may be expressed as "whether it is required". If a field is required in the authentication information statistical table, "yes" is displayed at the indication item of the field. Conversely, if a field is not required in the authentication information statistical table, "no" is displayed at the indication item of the field.

As can be seen from the foregoing, a device type includes Administrative and Common. The device type of the Internet of Things device may be reflected in the authentication information statistical table. Specifically, the authentication information statistical table of the Internet of Things device may also include a device type field, as shown by 405 in FIG. 4, which may specifically be expressed as is-superuser. If the device type of the Internet of Things device is Administrative, the field content item of the device type field 405 may be filled in with field content true or "yes". If the device type of the Internet of Things device is Common, the field content item of the device type field may be filled in with field content false or "no".

In order to ensure storage security of each Internet of Things device in the access authentication control DB, the password of the Internet of Things device may be salted and encrypted and then stored in the authentication information statistical table. "Salted and encrypted" means that the password is associated with an n-digit random number. The n-digit random number is called salt. In some embodiments, before the password is salted and encrypted, the password may be first encrypted with an encryption algorithm and then salted and encrypted after completion of the encryption. All the above information may be reflected in the authentication information statistical table of the Internet of Things device. In a specific implementation, the authentication information statistical table of the Internet of Things device may also include a salt storage field as shown by 406 in FIG. 4. The field content item of the salt storage field 406 is used for storing salt used when the Internet of Things device is salted and encrypted, that is, the random number described above.

In an embodiment, the authentication information statistical table of the Internet of Things device may also include an ID field as shown by 407 in FIG. 4. The ID field is mainly used for storing an ID of the authentication information statistical table. The ID of the authentication information statistical table may be objectID randomly generated by the service processing plug-in for each Internet of Things device, which is used as a unique ID of the authentication information statistical table in the access authentication control DB.

Content included in the authentication information statistical table of the Internet of Things device and an encryption manner of the password of the Internet of Things device may be configured through a configuration file of the service processing plug-in by the management device. For example, in the case of the configuration through the configuration file of the service processing plug-in, it may be set through a statement "auth.mongo.auth_query.collection=mqtt_user" that the authentication information statistical table of the Internet of Things device is stored through a table named mqtt_user. In another example, it may be indicated through a statement "auth.mongo.auth_query.password_field=password,salt" that associating the password of the Internet of Things device with salt is salting and encryption. Also, it may be indicated through a statement "auth.mongo.auth_query.password_hash=salt,sha256" that the password of the Internet of Things device is encrypted with a sha256 encryption algorithm and then salted and encrypted.

Step S302: Generate access authentication reference information of the Internet of Things device based on the authentication information statistical table, and store the access authentication reference information of the Internet of Things device in an access authentication control DB in the form of a key-value pair.

As can be seen from the foregoing, the first field (which may be any field) of the authentication information statistical table includes a field name item and a field content item. In an embodiment, the generating access authentication reference information of the Internet of Things device based on the authentication information statistical table may include: the access authentication reference information including at least one piece of key data and at least one piece of value data, taking a field name in the field name item of the first field as one piece of key data, and generating value data corresponding to the key data according to field content in the field content item of the first field. In some embodiments, generating value data of the first field according to field content in the field content item of the first field includes: directly taking the field content in the field content item of the first field as the value data corresponding to the key data of the first field; or splicing the field content in the field content item of the first field and comment description of the field content item together as the value data of the key data of the first field. For example, the authentication information statistical table of the Internet of Things device includes an ID field. Field content in the field content item of the ID field is "5d1bd79b0c7c8b118529b3d", and the comment description of the field content item is Objectid. Then, in the access authentication reference information, key data corresponding to the field is "id", and value data corresponding to the key data may be expressed as "5d1bd79b0c7c8b118529b3d". Alternatively, the value data corresponding to the key data may also be expressed as "Objectid ("5d1bd79b0c7c8b118529b3d")".

How the access authentication reference information of each Internet of Things device is stored in the form of a key-value pair in the access authentication control DB is introduced below through examples. It is assumed that the authentication information statistical table of the Internet of Things device may be expressed as shown in FIG. 4. FIG. 5 shows an access authentication control DB according to an embodiment of this application. 400 denotes the access authentication reference information of the Internet of Things device. The field name of the device type field 405 in FIG. 4 is "is_superuser", and the field name is used as a piece of key data. The field content in the field content item of the device type field 405 is "false", and "false" may be used as the value data corresponding to the above key data, as shown by 411 in FIG. 5.

Step S303: Receive a correspondence between a target operation of an Internet of Things device and a message type and login information of the Internet of Things device that are transmitted by a management device, and store the target operation, the message type, and the login information in a message control statistical table.

As can be seen from the foregoing, the Internet of Things platform may also include a message operation permission control DB. The message operation permission control DB is used for storing message operation permissions corresponding to a plurality of Internet of Things devices. The message operation permissions corresponding to the Internet of Things devices may be set by the administrator in advance through access control list (ACL) access control. In the description of the embodiments of this application, introduction is based on an example in which a message operation permission is set for the Internet of Things device. Specifically, the message operation permission may be set for the Internet of Things device or ACL access control is performed on the Internet of Things device through step S303 and step S304.

In step S303, the correspondence between the target operation of the Internet of Things device and the message type indicates that the Internet of Things device may perform the target operation on messages of the message type. The target operation may include one or more of a subscription operation and a publishing operation.

For example, if the message type is temperature and the target operation is the subscription operation, the correspondence between the target operation of the Internet of Things device and the message type indicates that the Internet of Things device may perform the subscription operation on temperature-related messages. The message type may also be called a topic. The topic is a unique ID of a message. Therefore, the message operation control over the Internet of Things device is actually the control over message types operable by the Internet of Things device.

After the correspondence between the target operation of the Internet of Things device and the message type and the login information of the Internet of Things device are received, such information may be stored in a message control statistical table. The message control statistical table may include a login information storage field and a message operation control field. The storing the correspondence between the target operation of the Internet of Things device and the message type and the login information of the Internet of Things device in a message control statistical table may include: storing the login information of the Internet of Things device in the login information storage field, and filling in the message operation control field according to the correspondence between the target operation of the Internet of Things device and the message type.

In some embodiments, the first field (which may be any field) in the message control statistical table may include a field content item and a field content item. The filling in the message operation control field according to the correspondence between the target operation of the Internet of Things device and the message type includes: filling in the field name item of the message operation control field with the target operation as a field name, and filling in the field content item of the message operation control field with the message type corresponding to the target operation as field content.

For example, FIG. 6 is a schematic diagram of a message control statistical table of an Internet of Things device according to an embodiment of this application. 501 denotes the login information storage field, and 502 denotes the message operation control field. As can be seen from the foregoing, the target operation may include a subscription operation and/or a publishing operation. Therefore, three message operation control fields are provided, which are 5020, 5021, and 5022 respectively. Each field may include a field name item as shown by 503 in FIG. 6 and a field content item as shown by 504 in FIG. 6. Content in the field name item in the login information storage field 501 may be "login information" or "username", and content in the field content item in the login information storage field 501 may be "user_01". A field name in the field name item of the message operation control field 5020 may be "publish", and field content in the field content item is "temperature".

In some embodiments, the message control statistical table may also include an ID field as shown by 505 in FIG. 6. The field is used for storing objectID automatically assigned by the service processing plug-in.

Step S304: Determine a message operation permission of the Internet of Things device based on the message control statistical table, and store the message operation permission of the Internet of Things device in a message operation permission control DB in the form of a key-value pair.

In an embodiment, the message operation permission of the Internet of Things device includes at least one piece of key data and at least one piece of value data, and the determining a message operation permission of the Internet of Things device based on the message control statistical table may include: taking the field name stored in the field name item of each field in the message control statistical table as one piece of key data; and generating value data corresponding to the key data according to the field content in the field content item of the corresponding field. In other words, the message operation permission of the Internet of Things device includes at least one piece of key data and at least one piece of value data corresponding to the at least one piece of key data, the key data is determined according to the field names stored in the field name items of the fields in the message control statistical table, and one field name corresponds to one piece of key data. The value data corresponding to the key data is generated based on the field content stored in the field content items of the fields.

It is assumed that the first field is any field in the message control statistical table. If the first field is a message operation control field, value data corresponding to key data of the first field may be obtained through the following steps: acquiring the field content in the field content item of the first field and a deployment environment of the Internet of Things device; splicing the field content in the field content item of the first field with the deployment environment of the Internet of Things device according to a message operation rule generation manner, to obtain a message operation rule corresponding to the Internet of Things device; and taking the message operation rule as the value data corresponding to the key data. For example, if the deployment environment of the Internet of Things device is a home environment for realizing smart home, the deployment environment of the Internet of Things may be expressed as "smarthome". If the field name of the first field is "publish" and the field content of the first field is "temperature message", key data included in a message operation permission of the Internet of Things is "publish", and value data corresponding to the key data is "/smarthome/% c/temperature". The value data is a message operation rule.

For example, FIG. 7 is a schematic diagram of a message operation permission control DB according to an embodiment of this application. 51 denotes the message operation permission corresponding to the Internet of Things device. The message operation permission may include key data "subscribe (indicating subscription)", and value data corresponding to the key data is "$SYS/#", as shown by 52 in FIG. 7. In another example, the message operation permission may also include key data "pubsub (indicating both subscribe and publish)", and value data corresponding to the key data is "/smarthome/% c/temperature", as shown by 53 in FIG. 7.

In some embodiments, the above process of setting the message operation permission for the Internet of Things device may be set by the administrator through the configuration file of the service processing plug-in in the management device. For example, the configuration file of the service processing plug-in may be opened through etc/emqx.conf to set the relevant message operation permission. For example, after the configuration file of the service processing plug-in is opened through etc/emqx.conf, it is indicated through a statement "auth.mongo.super_query.scollection=mqtt_user" that the login information of the Internet of Things device is stored in an authentication information statistical table named mqtt_user, and it is indicated through a statement "auth.mongo.super_query.super_field=is_superuser" that the Internet of Things device is administrative. A statement "acl_nomatch" indicates that the Internet of Things device may subscribe to and publish messages of all message types. A statement "auth.mongo.acl_query.collection=mqtt_acl" indicates that the target operation of the Internet of Things device, the message type, and the login information are stored in a message control statistical table named mqtt_acl.

Step S305: Receive a message transmission request transmitted by a target Internet of Things device, and invoke a service processing plug-in to perform access authentication on the target Internet of Things device based on an access authentication control DB.

Figure 8:
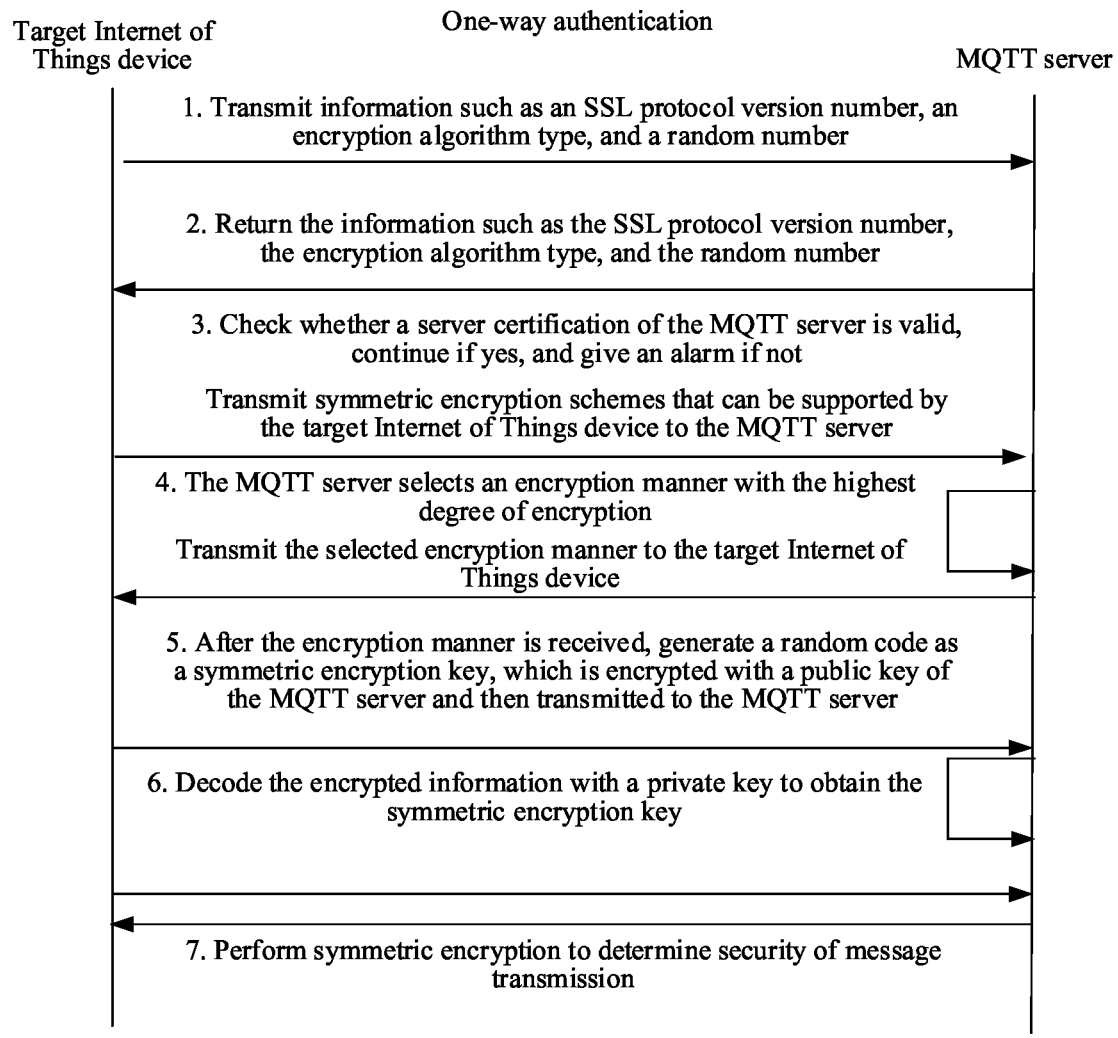
FIG. 8 is a schematic flowchart of one-way authentication according to an embodiment of this application.

In order to ensure security of message transmission, the message transmission request transmitted by the target Internet of Things device is encrypted with an encryption key. The encryption key is generated after the target Internet of Things device performs one-way authentication on the MQTT server. A process of performing, by the target Internet of Things device, one-way authentication on the MQTT server may be shown in FIG. 8, which specifically includes the following steps:

S1: The target Internet of Things device transmits connection information to the MQTT server. The connection information may include a secure socket layer (SSL) protocol version number, an encryption algorithm type, a random number, and the like.

S2: The MQTT server returns the information such as the SSL protocol version number, the encryption algorithm type, and the random number to the target Internet of Things device, and returns a server certification, that is, a public key certification, at the same time.

S3: The target Internet of Things device uses the information returned by the MQTT server to verify validity of the MQTT server, which may specifically verify any one or more of the following: whether the server certification has expired; whether a certification authority (CA) that issues a root certification of the server certification is reliable; whether a returned public key can correctly decrypt a digital signature in the server certification; and whether a domain name on the server certification matches an actual domain name of the server. After the verification is passed, communication is continued. Otherwise, the communication is terminated.

S4: The target Internet of Things device transmits symmetric encryption schemes that can be supported by the target Internet of Things device to the MQTT server for selection by the MQTT server.

S5: The MQTT server selects an encryption scheme with the highest degree of encryption from the symmetric encryption schemes provided by the target Internet of Things device, and returns the selected encryption scheme to the target Internet of Things device in plain text.

S6: The target Internet of Things device, after receiving an encryption manner returned by the MQTT server, generates a random code in the encryption manner, uses the random code as a symmetric encryption key during communication, encrypts the symmetric encryption key by using a public key returned by the MQTT server, and transmits the encrypted random code to the MQTT server.

S7: The MQTT server, after receiving the encrypted information returned by the target Internet of Things device, uses its own private key for decryption to obtain the symmetric encryption key, and in a next message transmission process, the MQTT server and the target Internet of Things may use the symmetric encryption key for symmetric encryption to ensure security of message transmission in the process.

The above authentication process may be called transport layer security (TLS) one-way authentication, mainly to verify identity of the MQTT server, and at the same time provide a message encryption transmission channel, so that a transmitted message is not in plain text, the target Internet of Things device verifies the identity of the MQTT server, and the MQTT server performs identity authentication control over the target Internet of Things device. TLS authentication requires two certifications, of which one is a root certification of the CA and the other is a server certification of the MQTT server. The server certification of the MQTT server is issued by the CA and verified with the CA's certification. Therefore, when the target Internet of Things device is connected, the root certification of the CA is carried to verify the server certification. If the verification is passed, it means that the MQTT server is safe. Otherwise, the MQTT server is not trusted and the connection is not performed.

A process of enabling, by the administrator, the TLS one-way authentication may be as follows: only starting relevant configuration through etc/emqx.conf in the configuration file of the service processing plug-in, and correctly specifying a position of the relevant certification.

Step S306: Invoke the service processing plug-in to acquire a message operation permission of the target Internet of Things device from the message operation permission control DB when the access authentication is passed.

As can be seen from the foregoing, an administrative device may operate any message, and does not need to consider the message operation permission when processing the message transmission service of the administrative device. Therefore, after the access authentication is performed on the target Internet of Things device through step S306, it may be first determined whether the target Internet of Things device is an administrative device. Step S308 is performed if the target Internet of Things device is an administrative device. Step S307 is performed if the target Internet of Things device is not an administrative device.

Step S307: Execute a message transmission service indicated by the message transmission request when the message transmission request matches the message operation rule indicated by the message operation permission.

In an embodiment, some feasible implementations included in step S307 may be obtained with reference to the description of step S204 in the embodiment in FIG. 2. Details are not described herein again.

In the embodiments of this application, the administrator sets the access authentication reference information for each Internet of Things device in advance through the configuration file of the service processing plug-in and stores the access authentication reference information in the access authentication control DB. In this way, when the target Internet of Things device is to be connected to the Internet of Things platform, access authentication is performed based on login information of the target Internet of Things device and the access authentication control DB. The login information of each target Internet of Things device is unique, which may also be understood as one machine, one password. In addition, the administrator may also set a message operation permission for each Internet of Things device in advance through the configuration file of the service processing plug-in and provides a TLS message encryption transmission channel, so that access authentication and message access operation processes of the Internet of Things platform are more secure. Moreover, the above functions in the embodiments of this application are all implemented based on a built-in plug-in of the MQTT server, which does not require additional deployment of services and saves costs.

Figure 9:
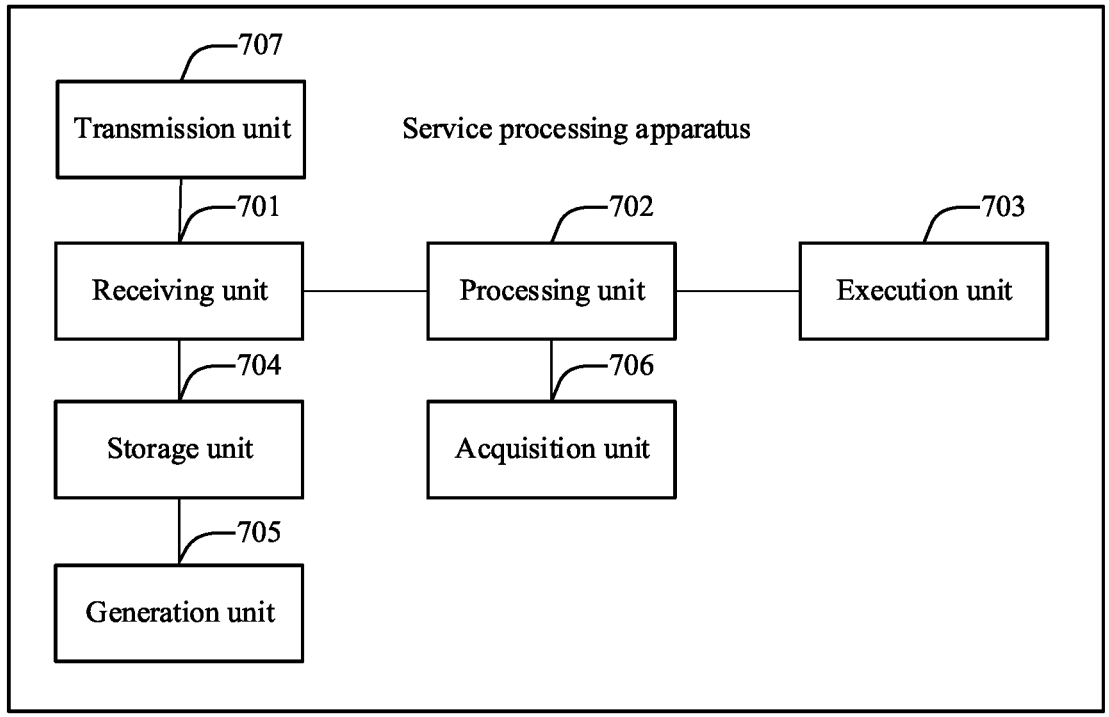
FIG. 9 is a schematic structural diagram of a service processing apparatus according to an embodiment of this application.

Based on the above system embodiments and method embodiments, an embodiment of this application further provides a service processing apparatus. Refer to FIG. 9 which is a schematic structural diagram of a service processing apparatus according to an embodiment of this application. The service processing apparatus shown in FIG. 9 may run the following units:

- a receiving unit 701 configured to receive a message transmission request transmitted by a target Internet of Things device;
- a processing unit 702 configured to invoke a service processing plug-in to perform access authentication on the target Internet of Things device, the service processing plug-in being configured in an MQTT server;
- the processing unit 702 being further configured to invoke the service processing plug-in to acquire a message operation permission of the target Internet of Things device when the access authentication is passed, the message operation permission indicating a message operation rule corresponding to the target Internet of Things device; and
- an execution unit 703 configured to execute a message transmission service indicated by the message transmission request when the message transmission request matches the message operation rule indicated by the message operation permission.

In an embodiment, the service processing apparatus further includes a storage unit 704 and a generation unit 705.

The receiving unit 701 is further configured to: receive login information of an Internet of Things device transmitted by a management device, the login information being information required for the Internet of Things device to access the MQTT server. The storage unit 704 is configured to store the login information of the Internet of Things device in an authentication information statistical table. The authentication information statistical table includes a login information storage field, and the login information of the Internet of Things device is stored in the login information storage field. The generation unit 705 is configured to determine access authentication reference information of the Internet of Things device based on the authentication information statistical table. The storage unit 704 is further configured to store the access authentication reference information of the Internet of Things device in an access authentication control DB in the form of a key-value pair.

In an embodiment, the message transmission request carries login information, the login information being login information required for the target Internet of Things device to access the MQTT server. The processing unit 702 is further configured to invoking the service processing plug-in to match the login information carried in the message transmission request in the access authentication control DB. It is determined that the access authentication on the target Internet of Things device is passed if target access authentication reference information matching the login information exists in the access authentication control DB. The target access authentication reference information is generated based on login information of the target Internet of Things device.

In an embodiment, the target access authentication reference information further includes a device type, and the execution unit 703 is further configured to perform the operation of invoking the service processing plug-in to acquire a message operation permission of the target Internet of Things device when the access authentication is passed and the device type of the target Internet of Things device is Common.

In an embodiment, the target access authentication reference information further includes a device type, and the execution unit 703 is further configured to execute the message transmission service indicated by the message transmission request when the device type of the target Internet of Things device is Administrative.

In an embodiment, the receiving unit 701 is further configured to: receive a correspondence between a target operation of an Internet of Things device and a message type and login information of the Internet of Things device that are transmitted by a management device, the target operation including one or more of the following: a subscription operation and a publishing operation.

The storage unit 704 is further configured to store the correspondence between the target operation of the Internet of Things device and the message type and the login information of the Internet of Things device in a message control statistical table. The message control statistical table includes a message operation control field and a login information storage field. The login information of the Internet of Things device is stored in the login information storage field, and the message operation control field is used for storing the correspondence between the target operation of the Internet of Things device and the message type.

The generation unit 705 is further configured to generate a message operation permission of the Internet of Things device based on the message control statistical table. The storage unit 704 is further configured to store the message operation permission of the Internet of Things device in the message operation permission control DB in the form of a key-value pair.

In an embodiment, a first field includes a field name item and a field content item, and the first field is any field in the message control statistical table.

The message operation permission of the Internet of Things device includes key data and value data corresponding to the key data. The key data is determined according to field names stored in the field name item of the first field, and one field name corresponds to one piece of key data. The value data corresponding to the key data is generated based on field content stored in the field content item in the first field.

In an embodiment, the first field is a message operation control field, and the apparatus further includes: an acquisition unit 706.

The acquisition unit 706 is configured to acquire the field content in the field content item of the first field and a deployment environment of the Internet of Things device.

The processing unit 702 is further configured to splice the field content in the field content item of the first field with the deployment environment of the Internet of Things device according to a message operation rule generation manner, to obtain a message operation rule corresponding to the Internet of Things device; and take the message operation rule as the value data corresponding to the key data.

In an embodiment, the processing unit 702, when invoking the service processing plug-in to acquire a message operation permission of the target Internet of Things device, performs the following steps: acquiring login information of the target Internet of Things device from the message transmission request; and invoking the service processing plug-in to acquire, based on the login information of the target Internet of Things device, the message operation permission of the target Internet of Things device from the message operation permission control DB.

In an embodiment, the message transmission request is transmitted by the target Internet of Things device after being encrypted with an encryption key, the encryption key being generated by the target Internet of Things device performing TLS one-way authentication on the MQTT server. The service processing apparatus further includes a transmission unit 707. When the target Internet of Things device performs one-way authentication on the MQTT server, the receiving unit 701 is further configured to receive connection information transmitted by the target Internet of Things device. The transmission unit 707 is configured to return a server certification to the target Internet of Things device in response to the connection information, so that the target Internet of Things device verifies validity of the MQTT server based on the server certification and transmits, in response to a determination that the MQTT server is valid, a plurality of symmetric encryption schemes supported by the target Internet of Things device. The processing unit 702 is further configured to select a target encryption scheme from the plurality of symmetric encryption schemes supported by the target Internet of Things device, and return the target encryption scheme, so that the target Internet of Things device generates the encryption key based on the target encryption scheme and returns the encryption key.

According to an embodiment of this application, the steps involved in the service processing methods shown in FIG. 2 and FIG. 3 may be performed by the units in the service processing apparatus shown in FIG. 9. For example, step S201 shown in FIG. 2 may be performed by the receiving unit 701 in the service processing apparatus shown in FIG. 9, step S202 and step S203 may be performed by the processing unit 702 in the service processing apparatus shown in FIG. 9, and step S204 may be performed by the execution unit 703 in the service processing apparatus shown in FIG. 9. In another example, step S301, step S303, and step S305 shown in FIG. 3 may be performed by the receiving unit 701 in the service processing apparatus shown in FIG. 9, step S302 and step S304 may be performed by the generation unit 705 and the storage unit 704 in the service processing apparatus shown in FIG. 9, and step S306 and step S307 may be performed by the processing unit 702 in the service processing apparatus shown in FIG. 9.

According to another embodiment of this application, the units in the service processing apparatus shown in FIG. 9 are classified based on logical functions. The above units may be separately or wholly combined into one or several other units, or one (or more) of the units therein may further be divided into a plurality of functionally smaller units. In this way, same operations can be implemented, and implementation of the technical effects of the embodiments of this application is not affected. In another embodiment of this application, the service processing apparatus may also include another unit. During practical application, these functions may also be cooperatively implemented by the another unit and may be cooperatively implemented by a plurality of units.

According to another embodiment of this application, the service processing apparatus shown in FIG. 7 may be constructed and a service processing method according to the embodiments of this application may be implemented by running a computer program (including program code) that can perform the steps involved in the method shown in FIG. 2 or FIG. 3 on processing elements and memory elements including a central processing unit (CPU), a random access storage medium (RAM), a read-only storage medium (ROM), and so on, for example, generic computing devices of computers. The computer program may be recorded in, for example, a computer storage medium, and may be loaded into the foregoing computing device by using the computer storage medium and run in the computing device.

In the embodiments of this application, when receiving the message transmission request transmitted by the target Internet of Things device, the MQTT server invokes the service processing plug-in therein to perform access authentication on the Internet of Things device. The access authentication on the Internet of Things device is realized through a plug-in function of the MQTT server, which does not require additional deployment of access authentication services and has wide universality. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule.

Such message operation control over the Internet of Things device can improve accuracy and security of the message transmission service.

Figure 10:
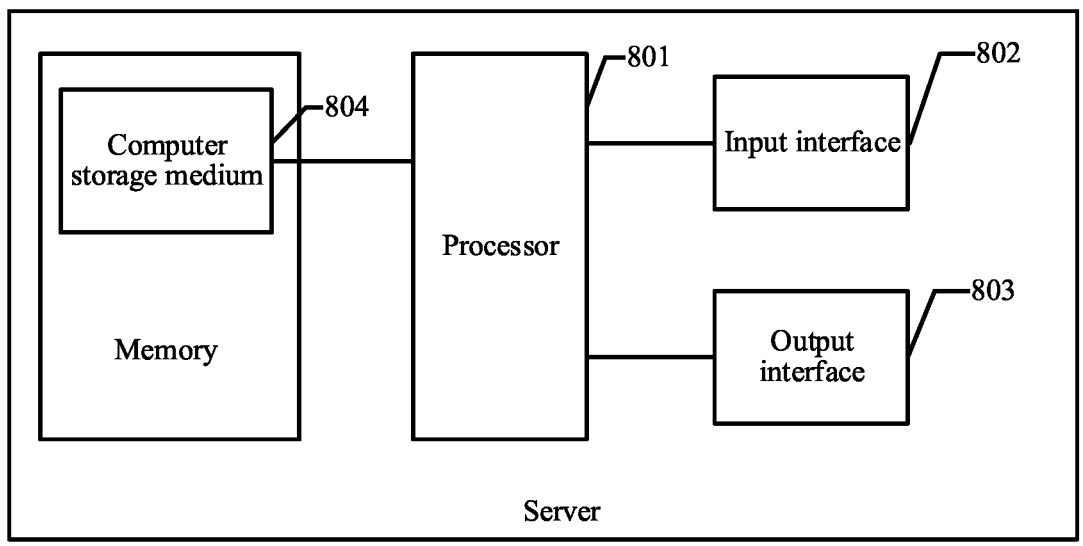
FIG. 10 is a schematic structural diagram of a server according to an embodiment of this application.

Based on the description of the above method embodiments and apparatus embodiments, this application further provides a server, corresponding to the foregoing MQTT server. Refer to FIG. 10 which is a schematic structural diagram of a server according to an embodiment of this application. The server shown in FIG. 10 may include a processor 801, an input interface 802, an output interface 803, and a computer storage medium 804. The processor 801, the input interface 802, the output interface 803, and the computer storage medium 804 may be connected through a bus or in another manner.

The computer storage medium 804 may be stored in a memory of the server. The computer storage medium 804 is configured to store a computer program. The processor 801 is configured to execute the computer program stored in the computer storage medium 804. The processor 801 (or referred to as a CPU) is a computing core and a control core of the server, which is adapted to implement one or more computer programs, and specifically to load and perform the above method embodiments.

In the embodiments of this application, when receiving the message transmission request transmitted by the target Internet of Things device, the MQTT server invokes the service processing plug-in therein to perform access authentication on the Internet of Things device. The access authentication on the Internet of Things device is realized through a plug-in function of the MQTT server, which does not require additional deployment of access authentication services and has wide universality. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule. Such message operation control over the Internet of Things device can improve accuracy and security of the message transmission service.

An embodiment of this application further provides a computer storage medium (memory). The computer storage medium is a memory device in the server and is configured to store programs and data. It is to be understood that the computer storage medium here may include a built-in storage medium of the server, and certainly, may also include an expanded storage medium supported by the server. The computer storage medium provides a storage space. The storage space stores an operating system of the server. Moreover, one or more computer programs suitable for being loaded and executed by the processor 801 are also stored in the storage space. The computer storage medium here may be a high-speed RAM memory, or a non-volatile memory, for example, at least one magnetic disk memory. In some embodiments, the computer storage medium may also be at least one computer storage medium that is located far away from the foregoing processor.

In an embodiment, the computer storage medium may be loaded by the processor 801 and execute one or more computer programs stored in the computer storage medium, which specifically executes the service processing method according to the above method embodiment.

In the embodiments of this application, when receiving the message transmission request transmitted by the target Internet of Things device, the MQTT server invokes the service processing plug-in therein to perform access authentication on the Internet of Things device. The access authentication on the Internet of Things device is realized through a plug-in function of the MQTT server, which does not require additional deployment of access authentication services and has wide universality. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule. Such message operation control over the Internet of Things device can improve accuracy and security of the message transmission service.

According to an invention of this application, an embodiment of this application further provides a computer product or a computer program. The computer product includes a computer program. The computer program is stored in a computer-readable storage medium. The processor 801 reads the computer program from the computer-readable storage medium, so that the server loads and executes the service processing method according to the above method embodiment.

In the embodiments of this application, when receiving the message transmission request transmitted by the target Internet of Things device, the MQTT server invokes the service processing plug-in therein to perform access authentication on the Internet of Things device. The access authentication on the Internet of Things device is realized through a plug-in function of the MQTT server, which does not require additional deployment of access authentication services and has wide universality. Moreover, after the access authentication is passed, the MQTT server invokes the service processing plug-in to acquire the message operation permission of the Internet of Things device, and executes the message transmission service indicated by the message transmission request if the message operation rule indicated by the message operation permission matches the message transmission request. In other words, an Internet of Things device corresponds to a message operation permission. The message operation permission specifies a message operation rule for message transmission of the Internet of Things device. A message transmission service requested by the Internet of Things device can be executed only when the message transmission request of the Internet of Things device meets the corresponding message operation rule. Such message operation control over the Internet of Things device can improve accuracy and security of the message transmission service.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. It is to be understood that this application is not limited to the precise structures described above and shown in the accompanying drawings, and various modifications and changes can be made without departing from the scope of this application. The scope of this application is subject only to the appended claims. The foregoing descriptions are merely exemplary embodiments of this application, but are not intended to limit this application. Any modification, equivalent replacement, or improvement made without departing from the spirit and principle of this application shall fall within the protection scope of this application.

What is claimed is:

1. A service processing method performed by a computer server acting as a message queuing telemetry transport (MQTT) server, and the service processing method comprising:
   receiving a message transmission request transmitted by a target Internet of Things device, the message transmission request carrying login information for the target Internet of Things device to access the MQTT server;
   acquiring the login information of the target Internet of Things device from the message transmission request;
   invoking a service processing plug-in to perform access authentication on the target Internet of Things device by matching the login information carried in the message transmission request in an access authentication control database (DB), wherein the access authentication control DB is generated by storing access authentication reference information of a plurality of Internet of Things devices and their corresponding login information in the form of a key-value pair during historical login;
   determining that the access authentication on the target Internet of Things device is passed when target access authentication reference information matching the login information of the target Internet of Things device exists in the access authentication control DB;
   invoking the service processing plug-in to acquire a message operation permission of the target Internet of Things device based on the login information of the target Internet of Things device in the access authentication control DB when the access authentication is passed, the message operation permission indicating a type of message of the target Internet of Things device and a message operation rule corresponding to the type of message of the target Internet of Things device; and
   executing a message transmission service indicated by the message transmission request when the message transmission request matches the message operation rule indicated by the message operation permission.

2. The service processing method according to claim 1, wherein the target access authentication reference information comprises a device type, and the invoking the service processing plug-in to acquire a message operation permission of the target Internet of Things device when the access authentication is passed comprises:
   performing the operation of invoking the service processing plug-in to acquire a message operation permission of the target Internet of Things device when the access authentication is passed and the device type of the target Internet of Things device is Common.

3. The service processing method according to claim 1, wherein the target access authentication reference information comprises a device type, and the method further comprises:
   executing the message transmission service indicated by the message transmission request when the device type of the target Internet of Things device is Administrative.

4. The service processing method according to claim 1, wherein the method further comprises:
   before receiving the message transmission request transmitted by the target Internet of Things device:
   receiving login information of a second Internet of Things device transmitted by a management device, the login information being information required for the second Internet of Things device to access the MQTT server; and
   storing the login information of the second Internet of Things device in an authentication information statistical table, the authentication information statistical table comprising a login information storage field, and the login information of the second Internet of Things device being stored in the login information storage field; and
   determining access authentication reference information of the second Internet of Things device based on the authentication information statistical table, and storing the access authentication reference information of the second Internet of Things device in the access authentication control DB in the form of a key-value pair.

5. The service processing method according to claim 1, wherein the method further comprises:
   receiving a correspondence between a target operation of an Internet of Things device and a message type and login information of the Internet of Things device that are transmitted by a management device, the target operation comprising one or more of the following: a subscription operation and a publishing operation;
   storing the correspondence between the target operation of the Internet of Things device and the message type and the login information of the Internet of Things device in a message control statistical table, the message control statistical table comprising a message operation control field and a login information storage field: the login information of the Internet of Things device being stored in the login information storage field, and the message operation control field being used for storing the correspondence between the target operation of the Internet of Things device and the message type; and
   generating a message operation permission of the Internet of Things device based on the message control statistical table, and storing the message operation permission of the Internet of Things device in the message operation permission control DB in the form of a key-value pair.

6. The service processing method according to claim 1, wherein the message transmission request is transmitted by the target Internet of Things device after being encrypted with an encryption key, the encryption key being generated by the target Internet of Things device performing transport layer security (TLS) one-way authentication on the MQTT server; and the performing, by the target Internet of Things device, one-way authentication on the MQTT server comprises:
  receiving connection information transmitted by the target Internet of Things device;
  returning a server certification to the target Internet of Things device in response to the connection information, so that the target Internet of Things device verifies validity of the MQTT server based on the server certification and transmits, in response to a determination that the MQTT server is valid, a plurality of symmetric encryption schemes supported by the target Internet of Things device; and
  selecting a target encryption scheme from the plurality of symmetric encryption schemes supported by the target Internet of Things device, and returning the target encryption scheme, so that the target Internet of Things device generates the encryption key based on the target encryption scheme and returns the encryption key.

7. A computer server acting as a message queuing telemetry transport (MQTT) server the computer server comprising: a processor, and a computer storage medium storing one or more instructions, the one or more instructions being adapted to be loaded by the processor and perform a service processing method including:
  receiving a message transmission request transmitted by a target Internet of Things device, the message transmission request carrying login information for the target Internet of Things device to access the MQTT server;
  acquiring the login information of the target Internet of Things device from the message transmission request;
  invoking a service processing plug-in to perform access authentication on the target Internet of Things device by matching the login information carried in the message transmission request in an access authentication control database (DB), wherein the access authentication control DB is generated by storing access authentication reference information of a plurality of Internet of Things devices and their corresponding login information in the form of a key-value pair during historical login;
  determining that the access authentication on the target Internet of Things device is passed when target access authentication reference information matching the login information of the target Internet of Things device exists in the access authentication control DB;
  invoking the service processing plug-in to acquire a message operation permission of the target Internet of Things device based on the login information of the target Internet of Things device in the access authentication control DB when the access authentication is passed, the message operation permission indicating a type of message of the target Internet of Things device and a message operation rule corresponding to the type of message of the target Internet of Things device; and
  executing a message transmission service indicated by the message transmission request when the message transmission request matches the message operation rule indicated by the message operation permission.

8. The computer server according to claim 7, wherein the target access authentication reference information comprises a device type, and the invoking the service processing plug-in to acquire a message operation permission of the target Internet of Things device when the access authentication is passed comprises:
  performing the operation of invoking the service processing plug-in to acquire a message operation permission of the target Internet of Things device when the access authentication is passed and the device type of the target Internet of Things device is Common.

9. The computer server according to claim 7, wherein the target access authentication reference information comprises a device type, and the method further comprises:
  executing the message transmission service indicated by the message transmission request when the device type of the target Internet of Things device is Administrative.

10. The computer server according to claim 7, wherein the method further comprises:
  before receiving the message transmission request transmitted by the target Internet of Things device:
  receiving login information of a second Internet of Things device transmitted by a management device, the login information being information required for the second Internet of Things device to access the MQTT server; and
  storing the login information of the second Internet of Things device in an authentication information statistical table, the authentication information statistical table comprising a login information storage field, and the login information of the second Internet of Things device being stored in the login information storage field; and
  determining access authentication reference information of the second Internet of Things device based on the authentication information statistical table, and storing the access authentication reference information of the second Internet of Things device in the access authentication control DB in the form of a key-value pair.

11. The computer server according to claim 7, wherein the method further comprises:
  receiving a correspondence between a target operation of an Internet of Things device and a message type and login information of the Internet of Things device that are transmitted by a management device, the target operation comprising one or more of the following: a subscription operation and a publishing operation;
  storing the correspondence between the target operation of the Internet of Things device and the message type and the login information of the Internet of Things device in a message control statistical table, the message control statistical table comprising a message operation control field and a login information storage field: the login information of the Internet of Things device being stored in the login information storage field, and the message operation control field being used for storing the correspondence between the target operation of the Internet of Things device and the message type; and
  generating a message operation permission of the Internet of Things device based on the message control statistical table, and storing the message operation permission of the Internet of Things device in the message operation permission control DB in the form of a key-value pair.

12. The computer server according to claim 7, wherein the message transmission request is transmitted by the target Internet of Things device after being encrypted with an encryption key, the encryption key being generated by the target Internet of Things device performing transport layer security (TLS) one-way authentication on the MQTT server;

and the performing, by the target Internet of Things device, one-way authentication on the MQTT server comprises:
- receiving connection information transmitted by the target Internet of Things device;
- returning a server certification to the target Internet of Things device in response to the connection information, so that the target Internet of Things device verifies validity of the MQTT server based on the server certification and transmits, in response to a determination that the MQTT server is valid, a plurality of symmetric encryption schemes supported by the target Internet of Things device; and
- selecting a target encryption scheme from the plurality of symmetric encryption schemes supported by the target Internet of Things device, and returning the target encryption scheme, so that the target Internet of Things device generates the encryption key based on the target encryption scheme and returns the encryption key.

13. A non-transitory computer-readable storage medium storing one or more instructions, the one or more instructions being adapted to be loaded by a processor of a computer server acting as a message queuing telemetry transport (MQTT) server and perform a service processing method including:
- receiving a message transmission request transmitted by a target Internet of Things device, the message transmission request carrying login information for the target Internet of Things device to access the MQTT server;
- acquiring the login information of the target Internet of Things device from the message transmission request;
- invoking a service processing plug-in to perform access authentication on the target Internet of Things device by matching the login information carried in the message transmission request in an access authentication control database (DB), wherein the access authentication control DB is generated by storing access authentication reference information of a plurality of Internet of Things devices and their corresponding login information in the form of a key-value pair during historical login;
- determining that the access authentication on the target Internet of Things device is passed when target access authentication reference information matching the login information of the target Internet of Things device exists in the access authentication control DB;
- invoking the service processing plug-in to acquire a message operation permission of the target Internet of Things device based on the login information of the target Internet of Things device in the access authentication control DB when the access authentication is passed, the message operation permission indicating a type of message of the target Internet of Things device and a message operation rule corresponding to the type of message of the target Internet of Things device; and
- executing a message transmission service indicated by the message transmission request when the message transmission request matches the message operation rule indicated by the message operation permission.

14. The non-transitory computer-readable storage medium according to claim 13, wherein the method further comprises:
- receiving a correspondence between a target operation of an Internet of Things device and a message type and login information of the Internet of Things device that are transmitted by a management device, the target operation comprising one or more of the following: a subscription operation and a publishing operation;
- storing the correspondence between the target operation of the Internet of Things device and the message type and the login information of the Internet of Things device in a message control statistical table, the message control statistical table comprising a message operation control field and a login information storage field; the login information of the Internet of Things device being stored in the login information storage field, and the message operation control field being used for storing the correspondence between the target operation of the Internet of Things device and the message type; and
- generating a message operation permission of the Internet of Things device based on the message control statistical table, and storing the message operation permission of the Internet of Things device in the message operation permission control DB in the form of a key-value pair.

15. The non-transitory computer-readable storage medium according to claim 13, wherein the target access authentication reference information comprises a device type, and the invoking the service processing plug-in to acquire a message operation permission of the target Internet of Things device when the access authentication is passed comprises:
- performing the operation of invoking the service processing plug-in to acquire a message operation permission of the target Internet of Things device when the access authentication is passed and the device type of the target Internet of Things device is Common.

16. The non-transitory computer-readable storage medium according to claim 13, wherein the target access authentication reference information comprises a device type, and the method further comprises:
- executing the message transmission service indicated by the message transmission request when the device type of the target Internet of Things device is Administrative.

17. The non-transitory computer-readable storage medium according to claim 13, wherein the method further comprises:
- before receiving the message transmission request transmitted by the target Internet of Things device:
- receiving login information of a second Internet of Things device transmitted by a management device, the login information being information required for the second Internet of Things device to access the MQTT server; and
- storing the login information of the second Internet of Things device in an authentication information statistical table, the authentication information statistical table comprising a login information storage field, and the login information of the second Internet of Things device being stored in the login information storage field; and
- determining access authentication reference information of the second Internet of Things device based on the authentication information statistical table, and storing the access authentication reference information of the second Internet of Things device in the access authentication control DB in the form of a key-value pair.

18. The non-transitory computer-readable storage medium according to claim 13, wherein the message transmission request is transmitted by the target Internet of Things device after being encrypted with an encryption key, the encryption key being generated by the target Internet of Things device performing transport layer security (TLS)

one-way authentication on the MQTT server; and the performing, by the target Internet of Things device, one-way authentication on the MQTT server comprises:
- receiving connection information transmitted by the target Internet of Things device;
- returning a server certification to the target Internet of Things device in response to the connection information, so that the target Internet of Things device verifies validity of the MQTT server based on the server certification and transmits, in response to a determination that the MQTT server is valid, a plurality of symmetric encryption schemes supported by the target Internet of Things device; and
- selecting a target encryption scheme from the plurality of symmetric encryption schemes supported by the target Internet of Things device, and returning the target encryption scheme, so that the target Internet of Things device generates the encryption key based on the target encryption scheme and returns the encryption key.

* * * * *